April 21, 1931.  H. R. RUSSON  1,801,369
VARIOMETER DIAL
Filed July 17, 1925
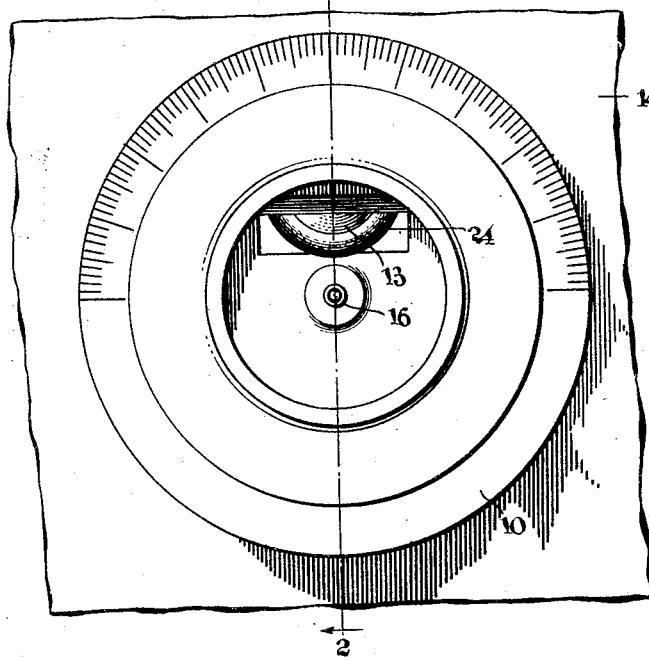
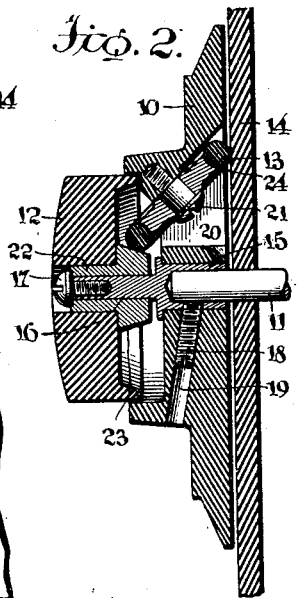
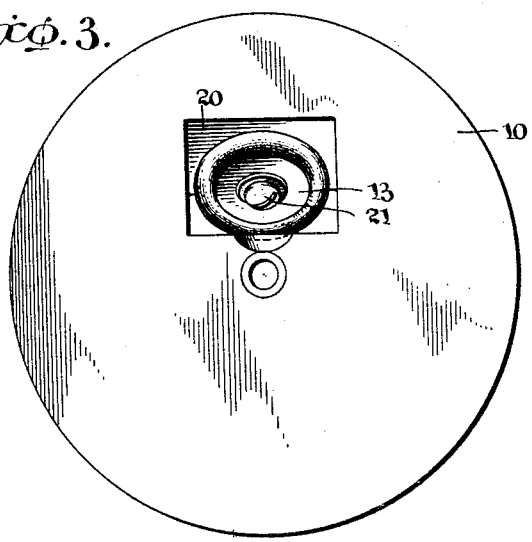
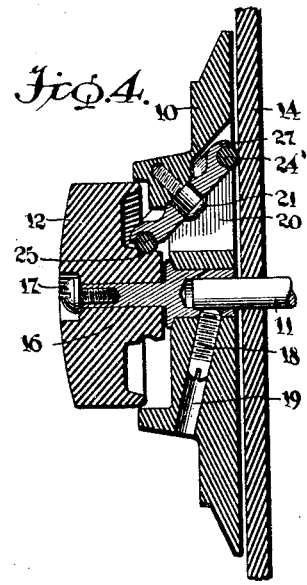
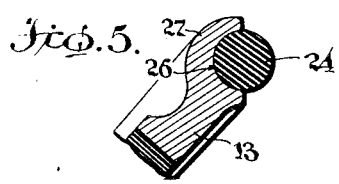
INVENTOR
Harry R. Russon, Patented Apr. 21, 1931

1,801,369

UNITED STATES PATENT OFFICE

HARRY R. RUSSON, OF AKRON, OHIO, ASSIGNOR OF ONE-HALF TO WILLIAM C. McCOY, OF CLEVELAND, OHIO

VARIOMETER DIAL

Original application filed August 21, 1922, Serial No. 583,252. Divided and this application filed July 17, 1925. Serial No. 44,217.

My invention relates to an improved mechanism for controlling adjustable impedance devices and it is particularly directed to dials for use with radio-electric equipment for adjusting variometer coils or other variable impedance devices used in such apparatus.

This is a division of my copending application, Serial No. 583,252, filed August 21st, 1922, for variometer dial.

The dials which have heretofore been proposed usually comprise a single unitary disc which is directly connected to the operating shaft of the variable impedance device. The adjustable impedance devices which are commonly used in radio-electric equipment are inherently of very light weight and are essentially delicate mechanisms. The adjustment of these mechanisms is particularly sensitive over certain ranges or positions of the device.

If an ordinary dial is used, the operating positions of the various impedance devices are so easily moved and inherently have such a small moment of inertia that the most careful operator will many times pass positions corresponding to desired broadcasting stations because of jerky movements of the dial or because the speed of movement of the device over the particularly range in which such broadcasting station is to be found is too great to give a discernible signal of the presence of the station.

By greatly increasing the inertia of the dial, speedy, smooth and particularly effective operation of the device over its entire range is obtained. Such a dial does not require the intense attention of the operator that is demanded when the ordinary dial is used, and broadcasting stations within the range of the apparatus are far more easily located.

An additional advantage of my device is that a supplemental knob, which is mounted concentrically with the main dial, constitutes a vernier adjustment which enables the operator to obtain sufficiently close adjustment of the receiving circuit through the use of one main variometer coil without the use of the supplemental coil which is ordinarily demanded. The range of movement of impedance coils is usually about one-half turn or about 180° for the complete range of the instrument. If a supplemental knob, such as I provide, with a speed ratio of about eight to one is used, the range of the instrument is then covered by moving the supplemental knob through four complete revolutions in contrast with the one-half turn of the main dial, which is customary with previously proposed dials.

An additional advantage which is inherent in my device is that after the variometer coil is once adjusted, there is no further and unintended movement of the adjusting mechanism. It is a very common experience in the operation of radio-electric equipment to lose a perfect adjustment of a receiving set during an important demonstration through a change in the position of the variometer coil produced by a jar or by a poorly balanced variometer. When my improved dial is employed, the perfect balance of the operating parts of the impedance device is not required.

My device can furthermore be placed on any radio-electric sending or receiving outfit without material alteration of the equipment and generally by a mere substitution of dials without any modification whatsoever in the remainder of the equipment.

Broadly, my invention constitutes a main dial and a supplemental vernier dial which operates the main dial and the attached variometer coil through an angularly-related roller in accordance with a desirable gear reduction.

In the accompanying drawings:

Fig. 1 is a front elevational view, with the supplemental knob removed, of a preferred form of my invention;

Fig. 2 is a transverse sectional elevational view, taken substantially on line 2—2 of Fig. 1; and Fig. 3 is a rear elevational view of the dial shown in Fig. 1;

Fig. 4 is a transverse sectional elevational view of a modified form of the dial shown in Fig. 1; and Fig. 5 is a detailed transverse sectional view of the friction drive wheel shown in Fig. 4.

The improved dial which is illustrated in Figs. 1 to 3 of the drawings, comprises a main dial 10 which is rigidly connected to a variometer, or other adjustable impedance device, by means of the shaft 11, a supplemental adjusting dial 12, and an angularly related roller or friction wheel 13 which is operatively interposed between the supplemental knob 13 and the face of the panel 14 and which is rotatably mounted on the main dial 10. It is not deemed necessary to show more than the shaft of the impedance device because of its familiar character.

The main dial 10 preferably comprises a center bushing 15 which is rigidly mounted in the center of the dial and which has an axially extending portion 16, upon which the supplemental adjusting knob 12 is rotatably mounted. The supplemental knob is rotatably and removably held in position by a headed screw 17. A set screw 18, which enters a threaded aperture 19 which is formed in the dial 10, serves to secure the dial to the shaft 11. The center bushing 15 may be either rigidly secured within an aperture suitably formed in the main dial 10, or the bushing 15 may be vulcanized or moulded into the dial in accordance with customary practice.

The adjusting knob 12 is rotatably mounted on the portion 16 of the bushing 15. The screw 17 which enters the outer end of the bushing 15 rotatably maintains the knob 12 in place. The knob 12 also has a bushing 22 rigidly secured therein, which has a frusto-conical portion 23, which extends beyond the inner face of the knob. The surface of the portion 23 is finely knurled or otherwise slightly roughened to provide a suitable bearing surface for the friction wheel 13.

The friction wheel 13 preferably has a rubber covered tread face 24 or a tread face of other friction material.

Fig. 4 shows a modified form of adjusting knob in which a portion 25 of the knob provides a contacting face against which the friction wheel 13 operates. The face of the knob may either be tapered or cylindrical. In either case, the inclined position of the wheel may be so arranged that it is inclined at substantially the same angle to the face of the panel as to the tread face of the adjusting knob.

Figs. 4 and 5 also show a modified form of the inclined friction wheel and the method of securing the tread member 24 in place. In this instance the wheel, being inclined at substantially the same angle to the panel 17 and the tread portion of the adjusting knob, exerts only lateral pressure against the center of the wheel. Having the direction of pressure in alignment with the axis of the friction wheel, insures smooth operation.

The main dial 10 also has an aperture 20 formed therein for receiving the friction wheel 13. One of the faces of the aperture is angularly inclined to the axis of the main dial in order to provide a mounting for the friction wheel 13. A screw 21 having a shouldered portion adapted to constitute a pivot for the wheel 13 enters a suitably threaded aperture in the dial 10. The axis of the screw 21 is at an angle to the shaft 11.

The friction wheel shown in Fig. 5 has a peripheral groove 26 in which the frictional tread band 24 is mounted, preferably being cemented in place. The face in which this groove is formed is preferably at an angle of substantially forty-five degrees with the axis of the wheel in order that all pressure on the thread may be effectively resisted by the sidewalls of the groove. This structure provides a peripheral flange 27 which effectively prevents displacement of the tread member and provides uniform bearing pressure at the center of the wheel.

Among the many advantages of the dial herein described is the ease with which it may be mounted on the machine. The only thing that is necessary is to remove the customary dial from the shaft of the impedance device and mount this improved dial thereon by tightening the set screw 18.

Although I have described only two preferred applications of the principles of my invention to an adjusting dial for use with radio-electric apparatus, the invention is obviously of broader scope than any particular detail design and I desire, therefore, that only such limitations shall be imposed as are indicated in the accompanying claims.

What I claim is:

1. In combination, an operating shaft for an adjustable device, two adjusting members therefor co-axial with each other and rotatable relatively to each other, one of said adjusting members being axially on one side of the other adjusting member, and a speed-reducing connection interconnecting one of said adjusting members to the other and including a part projecting through one of said adjusting members from the axial side on which said other adjusting member is located to the other axial side for co-operation with a stationary member.

2. As an article of manufacture, a dial having a slot adapted to receive a pivoted roller.

3. As an article of manufacture a graduated dial having a recess and a pivoted roller projecting therethrough.

4. As an article of manufacture a graduated dial having a perforation, a roller pivoted therein with its circumference extending beyond both surfaces of the dial.

5. In a variable control device for effecting fine rotary adjustments, the combination with a rotatable shaft and a panel of a control member secured to said shaft and rotatable therewith a traction wheel carried by said controlling member and frictionally engaging said panel, the periphery of said traction wheel being frictionally engageable at a point substantially diametrically opposite the point at which it engages said panel, whereby said traction wheel may be manually rotated while remaining in frictional engagement with said panel and caused to revolve about the axis of said controlling member, thereby effecting rotation of said controlling member.

6. The combination with a panel and a dial rotatably mounted thereon, of means wholly positioned to one side of the axis of said dial and extending through said dial to contact with said panel whereby the dial may be rotated, said means being accessible for manual operation from the front of the dial, and means holding said means extending through the dial in driving contact with said panel.

7. In a variable control device for effecting fine rotary adjustments, the combination with a rotatable shaft and a panel, of a knob drivingly secured to said shaft, a second knob coaxial with said first knob, said second knob being rotatable independently of said first knob, and a traction wheel operatively associated with said first knob and operable to engage said panel and said second knob conjointly for drivingly interconnecting said knobs.

8. In a variable control device for effecting fine rotary adjustments, a knob adapted to be secured to a shaft, a second knob coaxial with said first-mentioned knob and rotatable independently thereof, and a rotatable member secured to said first knob, said second knob being adapted to drivingly engage said rotatable member, said rotatable member being adapted to tractionally engage a panel adjacent to which the device is mounted, whereby said first-mentioned knob is rotated at a smaller angular velocity than said second-mentioned knob.

9. In a variable control device for effecting fine rotary adjustments, the combination with a rotatable shaft and a panel, of a knob drivingly secured to said shaft adjacent said panel, a second knob coaxial with said shaft and rotatable at a different angular velocity than said shaft, and a rotatable member secured to said first-mentioned knob and tractionally engaged with said panel and said second-mentioned knob conjointly, whereby rotation of said second-mentioned knob is adapted to impart a rotary movement to said first-mentioned knob at a relatively small angular velocity as compared to that of said second-mentioned knob.

10. In a variable control device for effecting fine rotary adjustments, the combination with a rotatable shaft and a panel, of a knob for rotating said shaft, a rotatable member secured to said knob and adapted to revolve about the axis of rotation of said shaft, said rotatable member being adapted to tractionally engage said panel and a second knob rotatable independently of said first-mentioned knob, said second knob being adapted to frictionally engage said rotatable member when imparting rotation thereto, the arrangement being such that a rotary movement of said second knob may rotate said rotatable member which in turn may rotate said first knob by reason of tractional engagement between said rotatable member and said panel, said first member being rotated at a relatively small angular velocity as compared with that of said knob.

11. In a variable control device for effecting fine rotary adjustments, the combination with a rotatable shaft and a panel, of a knob secured to and adapted for rotating said shaft, a second knob coaxial with said shaft but rotatable independently thereof, and means for drivingly interconnecting said knobs whereby rotation of said second knob imparts a relatively small angular velocity to said shaft as compared with the angular velocity of said second knob, said means comprising a traction wheel which is pivotally secured to said first knob and having an axis of rotation disposed at an angle to the axis of rotation of said shaft, said traction wheel being adapted to frictionally engage said panel and said second knob conjointly, whereby a rotary movement of said second knob may impart a rotary movement to said traction wheel and whereby said traction wheel is revolved about the axis of said shaft, thereby imparting a rotary movement to said first knob and said shaft.

12. The combination with an instrument adjusting shaft rotatably mounted in a panel, a member detachably connected to the outer end of said shaft, a dial secured to said member, an extension shaft carried by said member, a sleeve rotatably mounted on the extension shaft, a knob secured to said sleeve, of a planetary friction wheel angularly disposed and pivotally connected to the dial, a friction wheel carried by the sleeve, said planetary friction wheel frictionally engaging the friction wheel carried by the sleeve and the panel and extending through an opening in the dial.

13. In a device of the character described, the combination with a panel, of a rotatable shaft extending through the panel, a manually operable dial fixed to said shaft adjacent the panel, a rotatable driving wheel mounted in the dial laterally of the axis thereof, said wheel having its periphery engaging with the panel to impart rotary movements to the dial, a knob rotatably mounted on said shaft and having a driving portion engaging the periphery of said wheel, and means for securing said knob to said shaft and for permanently retaining the same in driving engagement with said wheel whereby the wheel is rotated by said knob to turn the dial when the knob is rotated and the knob is rotated by the wheel when the dial is manually turned.

14. A dial for use with an impedance device comprising a main dial, a drive wheel mounted angularly within said main dial and having portions of its rim extending beyond the opposite faces of said dial, a supplemental knob mounted concentrically with the main knob and adapted to engage the rim of said wheel.

In testimony whereof, I hereunto affix my signature.

HARRY R. RUSSON.